US012618372B2

(12) United States Patent
Devasigamani et al.

(10) Patent No.: US 12,618,372 B2
(45) Date of Patent: *May 5, 2026

(54) PROPULSION ASSEMBLY FOR AN AIRCRAFT

(71) Applicants: Airbus SAS, Blagnac (FR); Airbus Operations SAS, Toulouse (FR)

(72) Inventors: Nandakumar Devasigamani, Toulouse (FR); Lionel Czapla, Toulouse (FR); Jorge A. Carretero Benignos, Taufkirchen (DE)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,982

(22) Filed: Oct. 8, 2024

(65) Prior Publication Data

US 2025/0121927 A1 Apr. 17, 2025

(30) Foreign Application Priority Data

Oct. 12, 2023 (FR) .................................. FR2310977

(51) Int. Cl.
*F02C 7/224* (2006.01)

(52) U.S. Cl.
CPC .................................... *F02C 7/224* (2013.01)

(58) Field of Classification Search
CPC ............. F02C 7/224; F02C 7/22; F02C 7/222
See application file for complete search history.

(56) References Cited

U.S. PATENT DOCUMENTS

| | | | | |
|---|---|---|---|---|
| 5,203,163 A * | 4/1993 | Parsons | .................... | F02C 6/08 60/785 |
| 11,927,136 B1 * | 3/2024 | Burd | ........................ | F02C 7/143 |
| 12,065,965 B1 * | 8/2024 | Oechsle | .................. | F02K 3/075 |
| 2013/0305686 A1 * | 11/2013 | Conrardy | .................. | F02K 7/16 60/226.1 |
| 2023/0022291 A1 | 1/2023 | Carretero Benignos et al. | | |
| 2023/0167770 A1 | 6/2023 | Carretero Benignos et al. | | |
| 2024/0011440 A1 * | 1/2024 | Owoeye | ............... | F28D 20/021 |
| 2024/0328359 A1 * | 10/2024 | Grech | ........................ | F02C 3/22 |

FOREIGN PATENT DOCUMENTS

| | | |
|---|---|---|
| CN | 116591859 A | 8/2023 |
| EP | 4124738 A1 | 2/2023 |
| FR | 3127989 A1 | 4/2023 |
| FR | 3139160 A1 | 3/2024 |

OTHER PUBLICATIONS

French Search Report for corresponding French Patent Application No. 2310977 dated Apr. 18, 2024.

* cited by examiner

*Primary Examiner* — Rodolphe Andre Chabreyrie
(74) *Attorney, Agent, or Firm* — Greer Burns & Crain Ltd.

(57) ABSTRACT
A propulsion assembly having a propulsion system comprising a fairing, a rotary assembly having a combustion chamber and housed in the fairing, an exhaust nozzle positioned downstream of the combustion chamber and delimited by a nozzle wall, and ensuring the discharge of the combustion gases originating from the combustion of the dihydrogen in the combustion chamber, a dihydrogen tank, a supply duct which connects the tank and the combustion chamber, and at least one vane positioned inside the exhaust nozzle, wherein the supply duct has a duct portion arranged in the vane.

12 Claims, 4 Drawing Sheets

PROPULSION ASSEMBLY FOR AN AIRCRAFT

CROSS-REFERENCES TO RELATED APPLICATIONS

This application claims the benefit of French Patent Application Number 2310977 filed on Oct. 12, 2023, the entire disclosure of which is incorporated herein by way of reference.

FIELD OF THE INVENTION

The present invention relates to a propulsion assembly for an aircraft, said propulsion assembly comprising a propulsion system having an exhaust nozzle that discharges the combustion gases from the propulsion system and a heat exchange system arranged at the exhaust nozzle for ensuring heat energy is transferred to the dihydrogen of the propulsion system, and to an aircraft having at least one such propulsion system.

BACKGROUND OF THE INVENTION

In order to move, an aircraft conventionally has at least one propulsion assembly comprising a propulsion system that is arranged in a nacelle and may take the form of a jet engine or a turboprop engine. In each case, the propulsion system has a rotary assembly that drives a fan or a propeller. The rotary assembly constitutes a core of the propulsion system and, from the front to the rear, it has an air inlet that allows the introduction of air into a duct of the core, a compressor that compresses the air thus introduced, a combustion chamber in which the air thus compressed is mixed with a fuel, and a turbine that allows the combustion gases to expand and generates the rotation that is transmitted to the fan or to the propeller.

Downstream of the turbine, an exhaust nozzle ensures the discharge of the combustion gases.

It is also known, in particular in the case of dihydrogen, that the efficiency of the combustion of a fuel is improved if this fuel is heated before said combustion. It is also known to use some of the hot combustion gases discharged by the exhaust nozzle to heat the fuel.

SUMMARY OF THE INVENTION

An object of the present invention is to propose another solution for heating the dihydrogen before its combustion.

To that end, a propulsion assembly for an aircraft is proposed, having:

- a propulsion system comprising a fairing, a rotary assembly having a combustion chamber and housed in the fairing, an exhaust nozzle positioned downstream of the combustion chamber and delimited by a rear portion of the fairing, referred to as nozzle wall, and ensuring the discharge of the combustion gases originating from the combustion of the dihydrogen in the combustion chamber,
- a dihydrogen tank,
- a supply duct which connects the tank and the combustion chamber, and
- at least one vane positioned inside the exhaust nozzle, wherein the supply duct has a duct portion arranged in said vane.

With such an arrangement, the heat energy of the combustion gases is transferred to the dihydrogen.

Advantageously, the supply duct is a double-walled duct with an inner wall delimiting an inner volume in which the dihydrogen circulates and an outer wall delimiting an outer volume.

According to one particular embodiment, the outer volume contains a fluid.

Advantageously, the propulsion assembly has a pump which is fluidically connected to the outer volume and is arranged to set the fluid in the outer volume in motion.

According to one particular embodiment, the outer volume is evacuated.

Advantageously, said at least one vane is equipped with fins.

Advantageously, the propulsion assembly has an outer ring secured to the nozzle wall and an inner ring positioned on the inside of the outer ring, and said at least one vane is fixed between the outer ring and the inner ring.

Advantageously, said at least one vane is hollow and delimits a chamber in which is positioned at least a part of the duct portion, and at least one upstream orifice, arranged to allow the introduction of the hot combustion gases into the chamber, and at least one downstream orifice, arranged to allow the discharge of the hot combustion gases from the chamber, are made in the wall of the vane.

The invention also proposes an aircraft having at least one propulsion assembly according to one of the above variants.

BRIEF DESCRIPTION OF THE DRAWINGS

The aforementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

Figure 1:
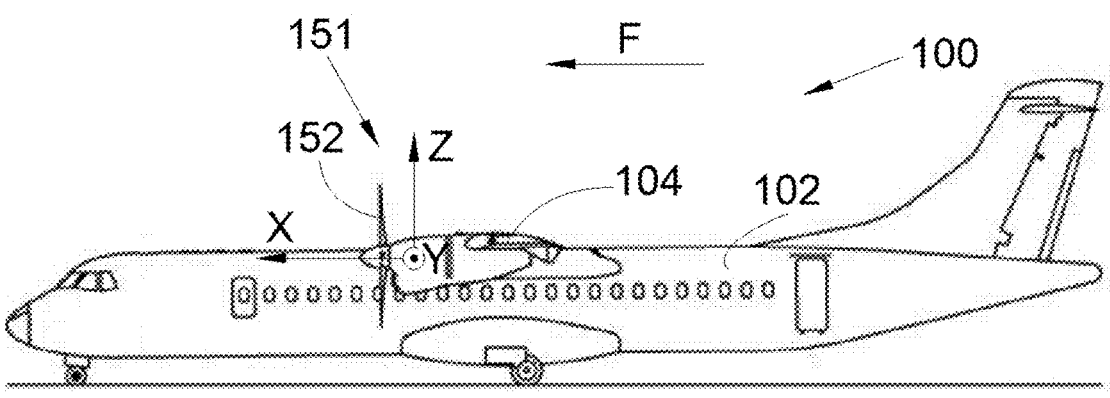
FIG. 1 is a side view of an aircraft having a propulsion assembly according to the invention.

In the following description, terms relating to a position are considered in relation to an aircraft in a position of forward movement, i.e., as shown in FIG. 1, in which the arrow F shows the direction of forward movement of the aircraft.

FIG. 1 shows an aircraft 100 that has a fuselage 102 on each side of which a wing 104 is fixed. At least one propulsion assembly 151 is fixed under each wing 104.

Figure 2:
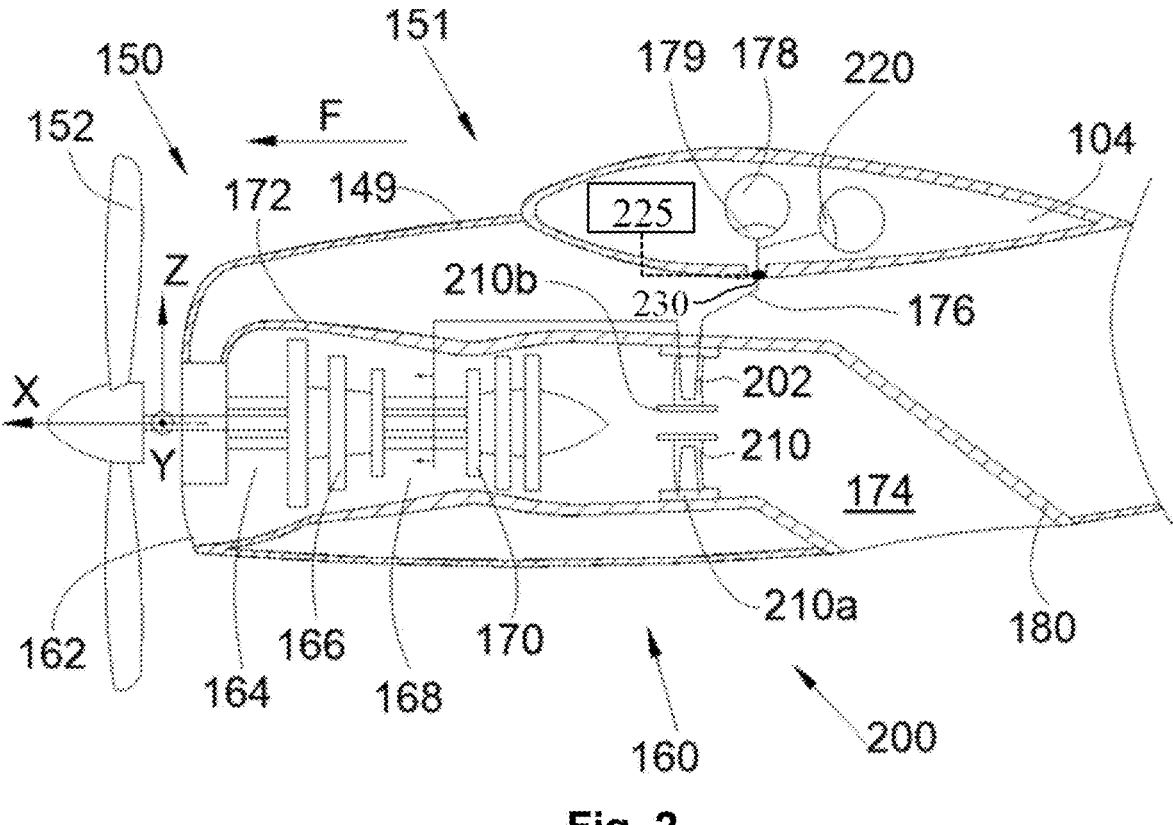
FIG. 2 is a schematic representation, from the side and in section, of a propulsion assembly according to one embodiment of the invention.

FIG. 2 shows the propulsion assembly 151, which comprises a nacelle 149 and a propulsion system 150 surrounded by the nacelle 149. In the embodiment of the invention that is presented here, the propulsion system 150 takes the form of a turboprop engine with a propeller 152 driven in rotation by a rotary assembly mounted inside a fairing 172 of the propulsion system 150 housed inside the nacelle 149, but the propulsion system 150 may also take the form of a jet engine that drives a fan. Thus, the propulsion system 150 generally has a rotary assembly and a movable element 152 (propeller or fan).

In the following description, and by convention, X refers to the longitudinal axis, which corresponds to the axis of rotation of the movable element 152 with positive orientation in the direction of forward movement of the aircraft 100; Y refers to the transverse axis, which is horizontal when the aircraft is on the ground; and Z refers to the vertical axis or vertical height when the aircraft is on the ground, these three axes X, Y and Z being mutually orthogonal.

Figure 6:
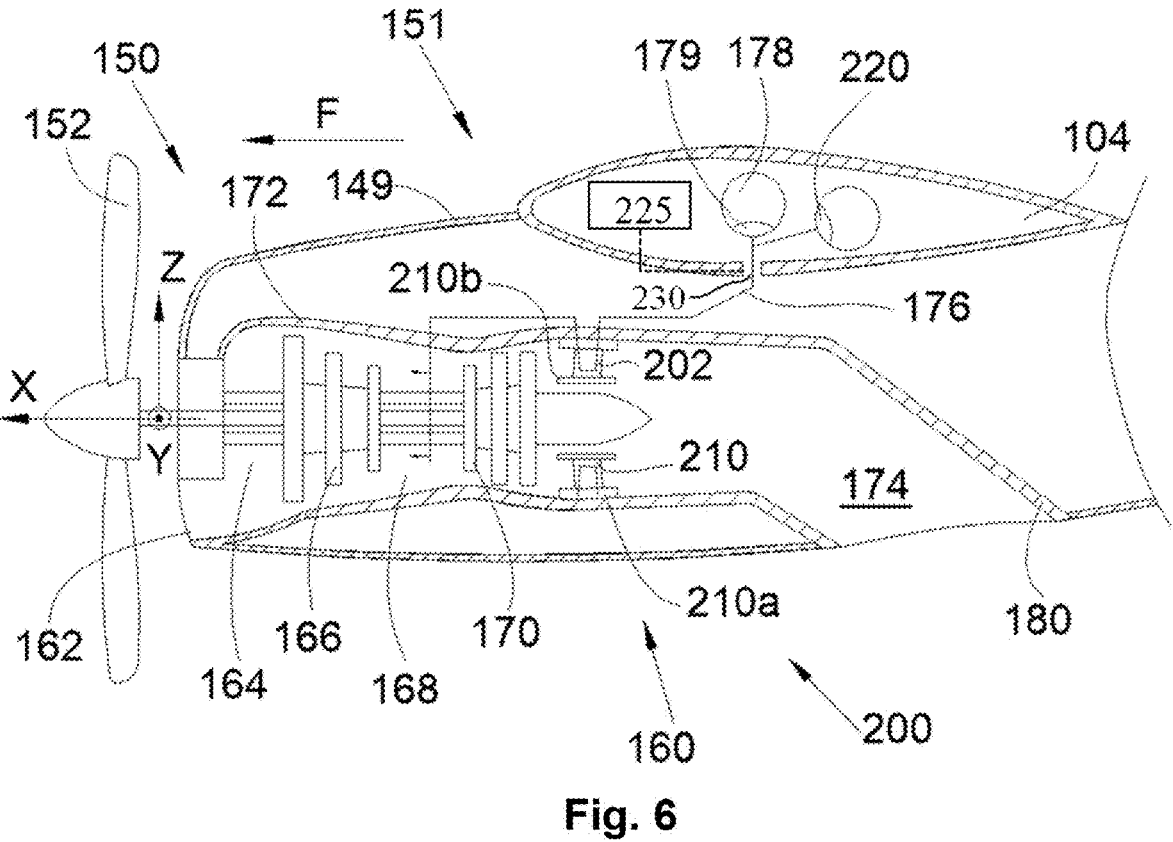
FIG. 6 is a schematic representation similar to that of FIG. 2 for another embodiment of the invention.

FIG. 2 and FIG. 6 show the propulsion system 150 in the case of a turboprop engine. A rotary assembly 160 constitutes a core of the propulsion system 150 and, from the front to the rear, has an air inlet 162 which allows the introduction of air into a duct 164 of the core, a compressor 166 which compresses the air thus introduced, a combustion chamber 168 in which the air thus compressed is mixed with the dihydrogen and the mixture is burned, and a turbine 170 which allows the combustion gases to expand and which generates the rotation which is transmitted to the movable element, in this instance the propeller 152. The elements of the rotary assembly 160 are surrounded by the fairing 172 formed of structural casings that are mounted around the elements of the rotary assembly 160 and make it possible to stiffen it, in order in particular to limit distortions thereof during operation.

The fairing 172 is, on the one hand, open to the front at the air inlet 162 and delimits the duct 164 and is, on the other hand, open to the rear at an exhaust nozzle 174 which is downstream of the turbine 170 and therefore of the combustion chamber 168 and ensures the discharge of the combustion gases originating from the combustion of the dihydrogen and the air in the combustion chamber 168. The rear portion of the fairing 172 that surrounds the exhaust nozzle 174 forms the nozzle wall 180.

The space between the nacelle 149 and the fairing 172 is occupied by various systems that ensure the operation of the propulsion system 150. In particular, in order to supply dihydrogen to the combustion chamber 168, the propulsion assembly 151 has a dihydrogen tank 178 which in this instance is housed in the wing 104, a supply duct 176 which connects the tank 178 and the combustion chamber 168, and a pump 179 which moves the dihydrogen from the tank 178 to the combustion chamber 168 through the supply duct 176. Without departing from the scope of the invention, the dihydrogen tank 178 may also be housed in another part of the aircraft 100, for example in the fuselage 102.

In order to heat the dihydrogen before it is injected into the combustion chamber 168, so as to achieve better combustion, the propulsion assembly 151 also has a heat exchanger system 200, which is arranged, when the propulsion system 150 is in operation, to ensure heat energy is exchanged between the hot combustion gases circulating in the exhaust nozzle 174 and the colder dihydrogen circulating in the supply duct 176. In general, the heat exchanger system 200 is arranged inside the exhaust nozzle 174.

In the embodiment in FIG. 2, the heat exchanger system 200 is arranged in the exhaust nozzle 174 behind the turbine 170.

In the embodiment in FIG. 6, the heat exchanger system 200 is arranged in the exhaust nozzle 174 at and around the turbine 170.

The propulsion assembly 151 also has at least one vane 210 positioned inside the exhaust nozzle 174, depending on the circumstances around or behind the turbine 170, so as to be immersed in the hot combustion gases and the supply duct 176 has a duct portion 202 which is arranged in said vane 210 in order to ensure heat energy is transferred from the hot combustion gases to the dihydrogen circulating in the duct portion 202 before it arrives in the combustion chamber 168.

The heat exchanger system 200 thus comprises the duct portion 202 of the supply duct 176 and heat energy is exchanged at this duct portion 202.

Starting from the dihydrogen tank 178, the supply duct 176 in this instance passes through the nozzle wall 180 so as to become the duct portion 202 which circulates in the vane 210. The supply duct 176 then passes back through the nozzle wall 180 before going back down into the combustion chamber 168 when it passes through the fairing 172.

Each vane 210 is fixed to the inside of the nozzle wall 180 by any suitable fixing means, such as screws, spot welding etc., one embodiment of which is described below.

According to one particular embodiment, for safety reasons, it is provided that the supply duct 176, and in particular the duct portion 202, is a double-walled duct with an inner wall delimiting an inner volume in which the dihydrogen circulates and an outer wall which is around the inner wall, an outer volume not containing dihydrogen in normal operating conditions, which is to say when there is no leak, being delimited between the inner wall and the outer wall.

As a result, even if there is a leak at the inner wall, the dihydrogen will spread out in the outer volume while remaining isolated.

The outer volume may be evacuated or it may be filled with a fluid inert with respect to the dihydrogen, such as dinitrogen for example.

In the event of a leak at the outer wall, the inert fluid will spread out of the outer volume or the outer volume will become filled with hot combustion gases.

In order to prevent a dihydrogen leak at the duct portion 202, the heat exchanger system 200 may have leak detection means and a control unit 225 connected to the leak detection means. The heat exchanger system 200 also has a valve 230 mounted on the supply duct 176 upstream of the duct portion 202 with respect to the direction of flow of the dihydrogen and made to open and close by the control unit 225. The control unit 225 makes the valve 230 close when the leak detection means detect a leak.

The leak detection means are for example pressure sensors positioned in the outer volume. A leak of the inner wall or of the outer wall will be detected by the pressure sensors owing to a change in the pressure in the outer volume: for example, a leak of the inner wall will be detected if the pressure in the outer volume is substantially equal to the pressure of dihydrogen in the inner volume and a leak of the outer wall will be detected if the pressure in the outer volume is substantially equal to the pressure of the atmosphere outside the duct portion 202.

When the outer volume is evacuated, the outer volume is for example fluidically connected to a vacuum pump.

When the outer volume is filled with a fluid, the latter may be static or in motion. When it is static, the fluid is not in motion inside the outer volume and in this case, the outer volume is preferably fluidically connected to an expansion vessel which makes it possible to adapt the pressure to the temperature of the fluid.

According to another embodiment, the heat exchanger system 200 has a pump 220 which is fluidically connected to the outer volume and is arranged to set the fluid in the outer volume in motion.

The duct portion 202 may be formed of multiple channels, each having a double wall, and the channels are supplied by a double manifold, wherein a first manifold supplies fluid to the various outer volumes and wherein a second manifold supplies dihydrogen to the various inner volumes.

Figure 3:
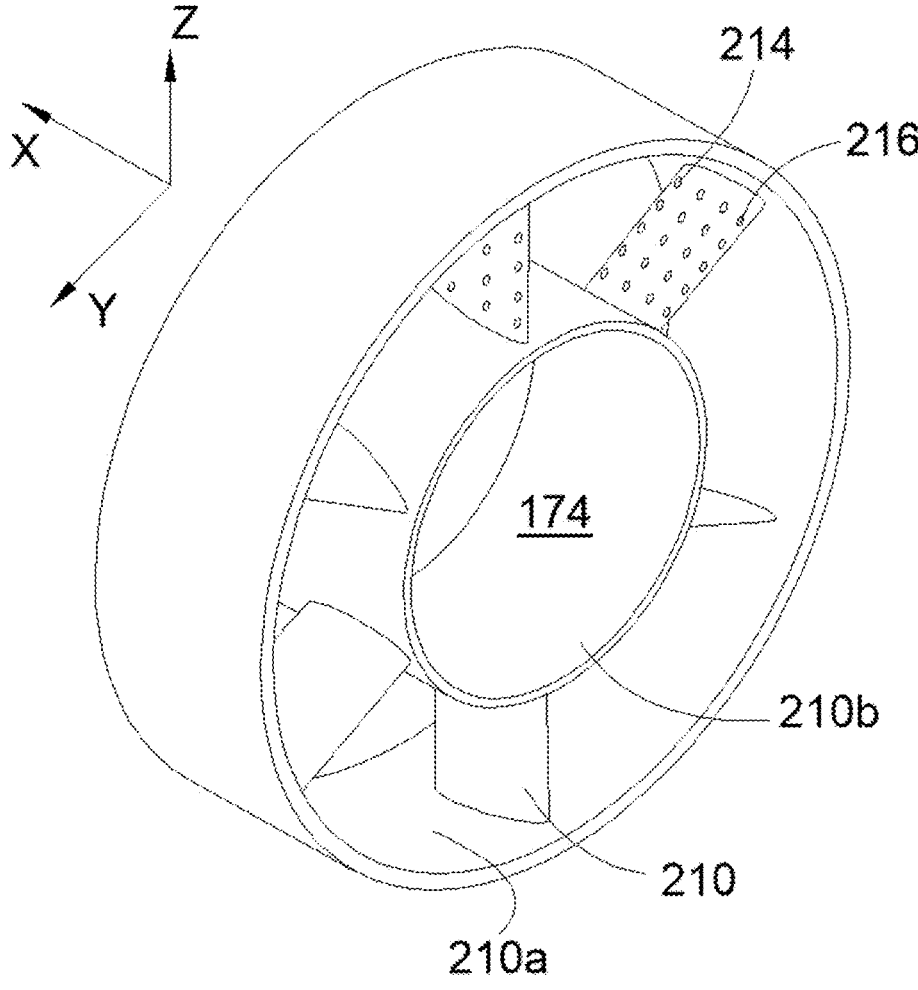
FIG. 3 is a perspective view of one particular embodiment of the invention.
Figure 4:
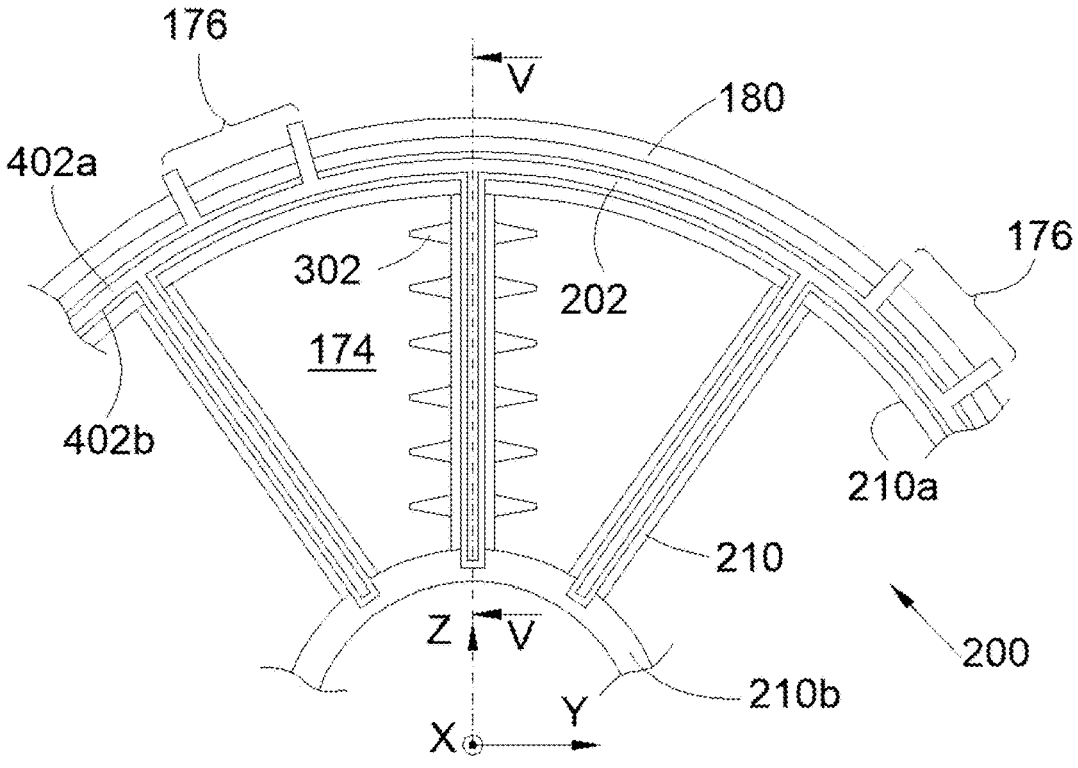
FIG. 4 is a front view of FIG. 3.
Figure 5:
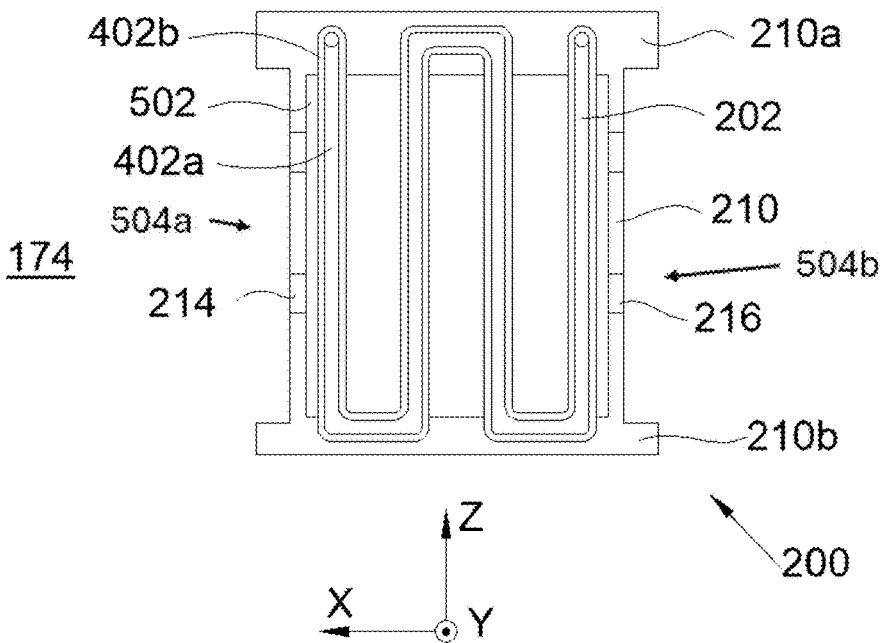
FIG. 5 is a section along the line V-V in FIG. 4.

FIGS. 3 to 5 show one particular embodiment of the vanes 210.

Each vane 210 extends in this case radially around the longitudinal axis X through the exhaust nozzle 174.

For aerodynamics reasons, each vane 210 is relatively flat and has an aerodynamic profile having a leading edge at the front of the vane 210 and a trailing edge at the rear of the vane 210.

To improve the exchange of heat between the hot combustion gases and the dihydrogen, each vane 210 is equipped with fins 302 which are produced from a material with high thermal conductivity integral with the vane 210. The fins 302 are immersed in the hot combustion gases.

In the embodiment of the invention that is presented here, the propulsion assembly 151 has an outer ring 210a, which is secured to the nozzle wall 180, and an inner ring 210b, which is positioned concentrically on the inside of the outer ring 210a which therefore has a diameter greater than that of the inner ring 210b.

Each vane 210 is radially fixed between the outer ring 210a and the inner ring 210b.

The fixing of the outer ring 210a to the nozzle wall 180 is ensured by any suitable fixing means, such as bolts, spot welding, etc. In the same way, each vane 210 is fixed to the outer ring 210a by any suitable fixing means and the inner ring 210b is fixed to the or each vane 210 by any suitable fixing means.

As FIG. 4 shows, in the case of a double-walled duct portion 202, there is an inner pipe 402a for the dihydrogen and around that there is an outer pipe 402b. These pipes 402a-b are supplied from the supply duct 176 coming from the tank 178 upstream of the fairing 172 and supply the supply duct 176 which goes towards the combustion chamber 168 downstream of the fairing 172. The pipes 402a-b circulate in the outer ring 210a, the inner ring 210b and in at least one vane 210.

According to one particular embodiment, which is shown in FIG. 5, each pipe 402a-b also circulates along the longitudinal axis X between a front part 504a of the vane 210 and a rear part 504b of the vane 210.

In this embodiment, each vane 210 is hollow and delimits a chamber 502 in which at least a part of the duct portion 202 is positioned.

At least one upstream orifice 214, arranged to allow the introduction of the hot combustion gases into the chamber 502, is made in the wall of the vane 210, in particular of the front part 504a. In the same way, at least one downstream orifice 216, arranged to allow the discharge of the hot combustion gases from the chamber 502, is made in the wall of the vane 210, in particular of the rear part 504b. The orifices 214 and 216 thus emerge in the chamber 502.

The diameters of the orifices 214 and 216 preferably range between 2 mm and 10 mm so as to ensure the circulation of the hot combustion gases in the chamber 502.

As a result, the hot combustion gases enter the chamber 502, whereupon they surround the duct portion 202 and improve the transfer of heat energy to the dihydrogen.

Of course, it is possible to have other orifices distributed over the vane 210.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, the propulsion assembly comprising:
   a propulsion system comprising a fairing, a rotary assembly having a combustion chamber and housed in the fairing, an exhaust nozzle positioned downstream of the combustion chamber and delimited by a rear portion of the fairing, referred to as a nozzle wall, and configured to ensure discharge of combustion gases originating from combustion of dihydrogen in the combustion chamber;
   a dihydrogen tank;
   a supply duct which connects the tank and the combustion chamber wherein the supply duct is a double-walled duct with an inner wall delimiting an inner volume in which the dihydrogen circulates and an outer wall delimiting an outer volume;
   at least one vane positioned inside the exhaust nozzle, wherein the supply duct has a duct portion arranged in the at least one vane,
   a heat exchanger, including a duct portion to transport the dihydrogen, arranged within the exhaust nozzle and configured to heat the dihydrogen prior to supplying the dihydrogen to the combustion chamber; and
   a leak detection means, being a pressure sensor arranged in the outer volume of the supply duct, connected to the heat exchanger and configured to, via a control unit, detect a leak in the heat exchanger, and a valve mounted on the supply duct arranged upstream of the heat exchanger and configured to, via the control unit, close when the leak detection means detects the leak in the heat exchanger.

2. The propulsion assembly according to claim 1, wherein the outer volume contains a fluid.

3. The propulsion assembly according to claim 2, further comprising:
   a pump which is fluidically connected to the outer volume and is configured to set the fluid in the outer volume in motion.

4. The propulsion assembly according to claim 3, wherein the outer volume is evacuated.

5. The propulsion assembly according to claim 1, wherein the at least one vane is equipped with fins.

6. The propulsion assembly according to claim 1, further comprising: an outer ring secured to the nozzle wall; and an inner ring positioned inside of the outer ring, wherein the at least one vane is fixed between the outer ring and the inner ring.

7. The propulsion assembly according to claim 1, wherein the at least one vane is hollow and delimits a chamber in which is positioned at least a part of the duct portion of the heat exchanger, and wherein at least one upstream orifice, introduces the combustion gases into the chamber, and at least one downstream orifice; discharges the combustion gases from the chamber, are made in a wall of the vane.

8. An aircraft comprising:
   at least one propulsion assembly according to claim 1.

9. The propulsion assembly according to claim 1, wherein the pressure sensor measures a pressure and is configured to detect, via the control unit, the leak of one or more of the inner wall or the outer wall.

10. The propulsion assembly according to claim 9, wherein the leak detection means determines at least one of, via the control unit: the leak being at the inner wall when the pressure measured at the outer volume is substantially equal to a pressure of the dihydrogen in the inner volume; or the leak being at the outer wall when the pressure measured at the outer volume is substantially equal to a pressure of the atmosphere outside of the duct portion of the heat exchanger.

11. A propulsion assembly for an aircraft, the propulsion assembly comprising:
   a propulsion system comprising a fairing, a rotary assembly having a combustion chamber and housed in the fairing, an exhaust nozzle positioned downstream of the combustion chamber and delimited by a rear portion of the fairing, referred to as a nozzle wall, and configured to ensure discharge of combustion gases originating from combustion of dihydrogen in the combustion chamber;
   a dihydrogen tank;
   at least one vane positioned inside the exhaust nozzle;
   an outer ring secured to the nozzle wall;
   an inner ring positioned on the inside of the outer ring and wherein the at least one vane is fixed between the outer ring and the inner ring;
   a supply duct which connects the tank and the combustion chamber, the supply duct including, at the fairing between the dihydrogen tank and the combustion chamber, an inner pipe and an outer pipe surrounding the inner pipe, the inner pipe and the outer pipe configured to circulate in the outer ring, the inner ring, and the at least one vane, wherein the supply duct is a double-walled duct with an inner wall of the inner pipe delimiting an inner volume in which dihydrogen circulates and an outer wall of the outer pipe delimiting an outer volume;
   a heat exchanger, arranged at the fairing encompassing the inner pipe and the outer pipe and configured to heat the dihydrogen prior to supplying the dihydrogen to the combustion chamber; and
   a leak detection means, being a pressure sensor arranged in the outer volume of the supply duct, connected to the heat exchanger and configured to, via a control unit, detect a leak in the heat exchanger; and a valve mounted on the supply duct arranged upstream of the heat exchanger and configured to, via the control unit, close when the leak detection means detects the leak in the heat exchanger.

12. The propulsion assembly according to claim 11, wherein the outer pipe and the inner pipe of the supply duct at the fairing further circulates along a longitudinal X-axis between a front part of the at least one vane and a rear part of the at least one vane.

\* \* \* \* \*